United States Patent
Lee

(10) Patent No.: US 6,680,444 B1
(45) Date of Patent: Jan. 20, 2004

(54) STRUCTURE OF A SWITCH FOR ELECTRONIC DEVICE

(75) Inventor: King-Long Lee, Hsin-Tien (TW)

(73) Assignee: Shin-Jiuh Corp., Taipei Hsien (TW)

( * ) Notice: Subject to any disclaimer, the term of this patent is extended or adjusted under 35 U.S.C. 154(b) by 0 days.

(21) Appl. No.: 10/283,203

(22) Filed: Oct. 30, 2002

(51) Int. Cl.⁷ .......................... H01H 9/00; H01H 21/24
(52) U.S. Cl. ...................... 200/4; 200/11 R; 200/556; 200/557; 200/339
(58) Field of Search ...................... 200/4, 11 R–11 TW, 200/553–562, 303, 309, 6 R, 6 A, 6 B–6 C, 17 R, 18, 565

(56) References Cited

U.S. PATENT DOCUMENTS

| | | | |
|---|---|---|---|
| 2,672,531 A | * 3/1954 | Stevenson | 200/4 |
| 3,772,484 A | * 11/1973 | Roeser | 200/4 |
| 5,008,498 A | * 4/1991 | Yamazaki | 200/11 R |
| 5,010,214 A | * 4/1991 | Yamazaki | 200/6 B |
| 5,817,995 A | * 10/1998 | Wojtanek | 200/4 |

* cited by examiner

Primary Examiner—J. R. Scott
(74) Attorney, Agent, or Firm—Birch, Stewart, Kolasch & Birch, LLP

(57) ABSTRACT

A structure of an electronic switch is disclosed. The structure of the electronic switch comprises an adjustment groove in the neck portion of the button, a pressing element disposed in the adjustment groove, and an elastic plate area which is defined by a slit of the case of the switch. A plurality of pressing points in a form of grooves is disposed on the elastic plate area at a position where the adjustment groove is positioned, wherein the grooves correspond to every electrical signals generated by the switch, allowing to press and push the button to move the pressing element in right and left, or up and down directions through an external force, in doing so, the pressing element presses the corresponding pressing points generating the corresponding obvious synchronization contact stimulation.

8 Claims, 4 Drawing Sheets

STRUCTURE OF A SWITCH FOR ELECTRONIC DEVICE

BACKGROUND OF THE INVENTION

1. Field of the Invention

The present invention relates to a structure of an electronic switch for an electronic device, and more particularly relates to a structure of an electronic switch that can be used in electronic devices such as mobile phone, digital camera, digital video camera and alike for providing multi-segment control signals.

2. Background of the Invention

With the rapid advancement and development in personal digital products have paved a trend for every type of digital product to be lighter, thinner, shorter and smaller. The traditional design uses the direction keys for making selections through the visual display in the display window, and therefore the size of the digital product is limited and cannot be smaller. Some of the manufacturers in this field have developed an electronic switch which allows a user to select and operate the selected functions that are displayed in the display window of mobile phone by touching, pushing, or pressing the electronic switch for selecting and/or operating the selected functions through the display window panel. This allows easier operation and also allows size reduction.

The above-mentioned structure of the electronic switch comprises a case, a button, a first resilient element, a second resilient element and a cover. When the button is pushed backward and forward by using an external force, the neck portion of the button will move in a first device area of the case to initiate the rotation of the rotating portion. When the rotating portion rotates, the free end of the second resilient element will extend towards a second device area of the case. In the meantime, a containing end of the first resilient element, which is fixed on a rear surface of the rotating portion will contact the inner part of the first device area to output an electrical signal for controlling the selection of functions that are displayed in the display window.

The structure of the electronic switch can be designed to match with the angle of the button set, and the design generally is multi-segment signal control type, for example, classified as a single page roll or continuation roll according to the specific angle of the button set, allowing the user to have easier control on the rolling pages. However, the present design allows the user the selection feature by pressing down the button, which forms as an external resilient portion on the case and additionally a protruded point is disposed on the resilient portion. When the protruded point is moved between the positioning hole and the sliding portion, a clicking sound is created, indicating the user that the switch has been substantially pressed, but however there is no other contact stimulation available to indicate the user of electrical signals generated from moving the button in right and/or left directions in specific angles. Besides, the protruded point of the conventional design is made of a rubber material, the case and the top of the resilient portion of the button are made of metallic material, thus the protruded point will be polished and damaged as a result of use over a certain period of time and cause loss of contact stimulation function.

SUMMARY OF THE INVENTION

Accordingly, it is an object of the present invention to provide a new structure of an electronic switch in order to resolve the defects of the aforementioned prior art.

In order to achieve the above object and other advantages of the present invention, a structure of the electronic switch comprising an adjustment groove in the neck portion of the button, a pressing element disposed in the adjustment groove, and an elastic plate area which is defined by a slit of the case of the switch. A plurality of pressing points in a form of grooves are disposed on the elastic plate area at a position where the adjustment groove is positioned, wherein the grooves correspond to every electrical signals generated by the switch, allowing to press and push the button to move the pressing element in right and left, or up and down directions through an external force, in doing so, the pressing element presses the corresponding pressing points generating the corresponding obvious synchronization contact stimulation.

According to another embodiment of the present invention, the elastic plate area and the pressing element are made of metallic material to reducing polishing and damaging effects in order to increase life-time or the durability of the switch.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a more complete understanding of the present invention, reference will now be made to the following detailed description of preferred embodiments taken in conjunction with the accompanying drawings, in which.

DESCRIPTION OF THE PREFERRED EMBODIMENTS

Figure 1:
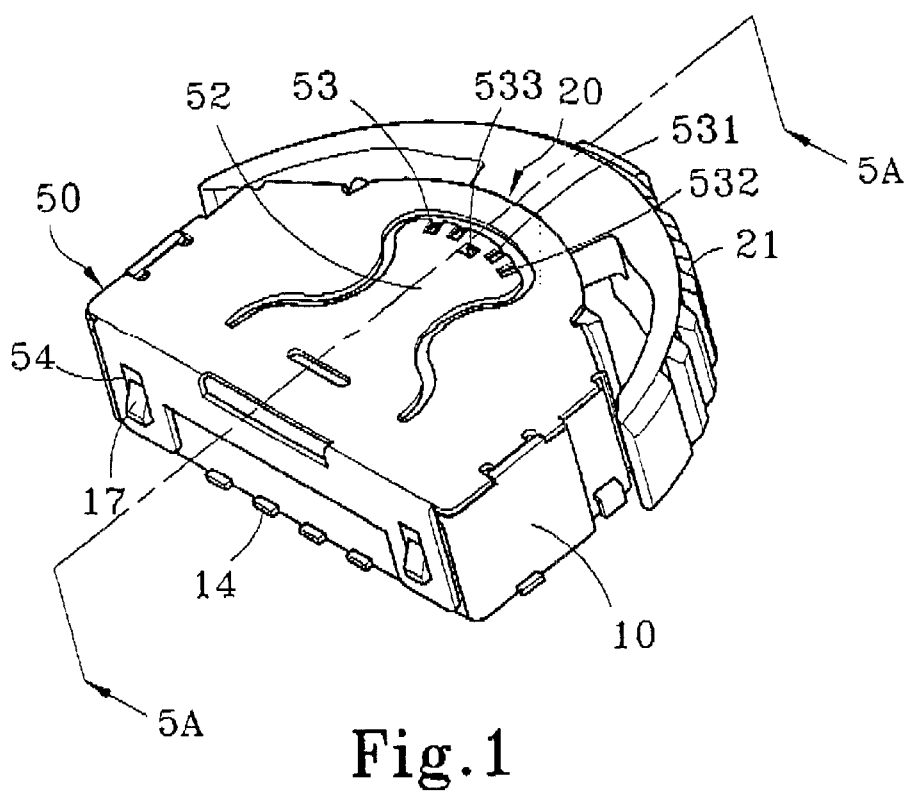
FIG. 1 is a view of an embodiment of a structure of an electronic switch of the present invention.

Reference will be made in detail to the preferred embodiments of the invention, examples of which are illustrated in the accompanying drawings. Wherever possible, the same reference numbers are used in the drawings and the description to refer to the same or like parts.

Figure 3:
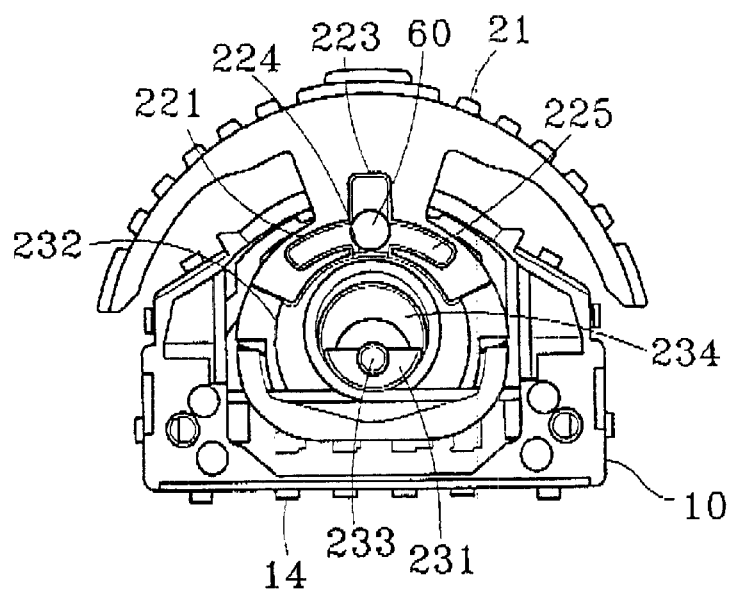
FIG. 3 is a view of an embodiment showing before the cover is placed on the top of the structure of the electronic switch of the present invention.
Figure 2:
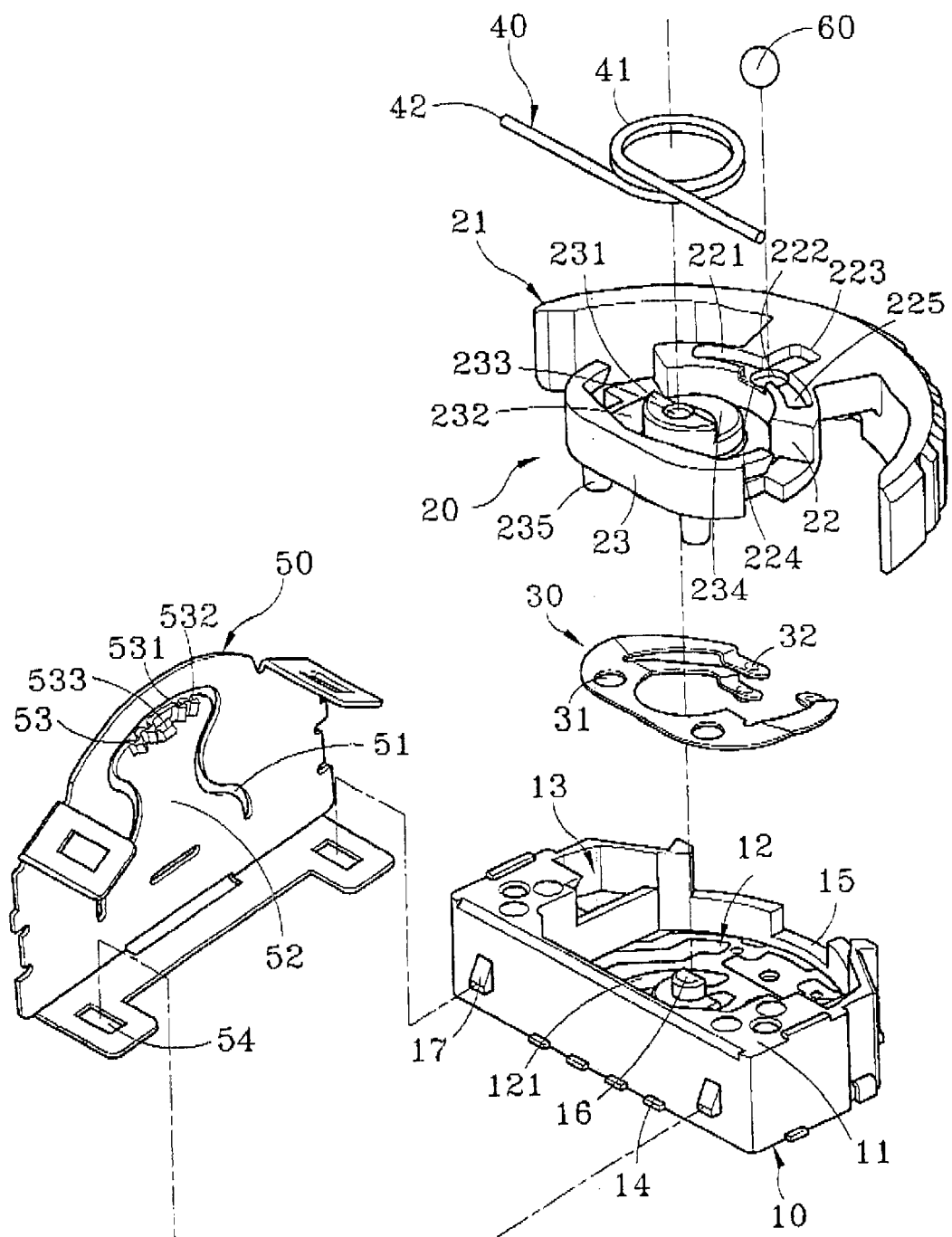
FIG. 2 is an exploded view of the structure of the electronic switch of the present invention.

Referring to the FIGS. 1, 2 and 3, the electronic switch of the present invention comprises a case 10 having a first and second device areas 12 and 13, a button 20 positioned within the first device area 12 and a cover 50 assembled on the case 10 covering the first and second device areas 12 and 13.

The case 10 comprises a thick portion 11, wherein the first and second device areas 12 and 13 are located within the thick portion 11. A conducting circuit 121 is positioned at a base surface of the first device area 12, and the conducting circuit 121 is electrically coupled with contact terminals 14 of the thick portion 11 forming an electrical circuitry to receive electrical signals and to control electrical signals output. The thick portion 11 comprises a space 15 for receiving the action of the button 20 corresponding to the first device area 12, an axle 16 located within the first device area 12 which connects axially with the button 20, and a buckling element 17 disposed at a bottom of the thick portion 11.

The button 20 comprises an arch-shaped button cap 21. The, button cap 21 comprises a neck portion 22, and a side of the neck portion 22 is rotatably engaged with a rotating portion 23. The neck portion 22 comprises an adjustment groove 221, in which a positioning hole 222 is disposed at a central region. A pressing element 60 is positioned within the positioning hole 222 of the adjustment groove 221. The pressing element 60 is a metallic spherical object that moves downwardly corresponding to the downward movement of the button 20. A guiding groove 223 and a guiding slot 224 are disposed respectively at an upper and a lower sides of the positioning hole 222 of the adjustment groove 221 and spaced apart from the positioning hole 222 allowing and corresponding to right and left movement of the button 20. A wing portion 225 extends from two sides of the adjustment groove 221 for fitting the pressing point 53. A protruded axial portion 231 is formed on the rotating portion 23. The protruded axial portion 231 is connected to the axle 16 with a moving portion 232 surrounding the axial portion 231. A positioning portion 233 having an arch-shaped sliding portion 234 on a side is positioned at a central region of the axial portion 231.

The first resilient element 30 comprises a pair of symmetrical positioning areas 31. The positioning areas 31 position the first resilient element 30 into protrusions 235 of the rotating portion 23. The first resilient element 30 further comprises a pair of extended symmetrical contacting ends 32. The contacting ends 32 can come in contact with the electrical circuit of the first device area 12 as they rotate along with the rotating portion 23 for outputting an electrical signal.

The second resilient element 40 comprises a receiving chamber 41, positioned axially on an outer edge of the axial portion 231, and extended free ends 42 are positioned on two sides of the receiving chamber 41. The extended free ends 42 are positioned within the second device area 13.

The cover 50 assembled on the thick portion 11 covering the case 10. An elastic plate area 52 is defined by a slit 51 on the cover 50. A plurality of pressing points 53 is formed as grooves around the elastic plate area 52 in a position corresponding to the adjustment 221 to correspond to every segment of switching signals. The pressing points 53 that correspond to right and left or up and down selection of the button 20 are respectively classified as first and second horizontal pressing point 531, 532 and a vertical pressing point 533, with the first and second pressing points 531 and 532 on both right and left sides in addition to the vertical pressing point 533. The structure of the electronic switch of the present invention comprises of a 5-segmented switching control. Further, the cover 50 comprises a buckling block 54 for buckling with the buckling element 17 of the case 10.

Figure 4A:
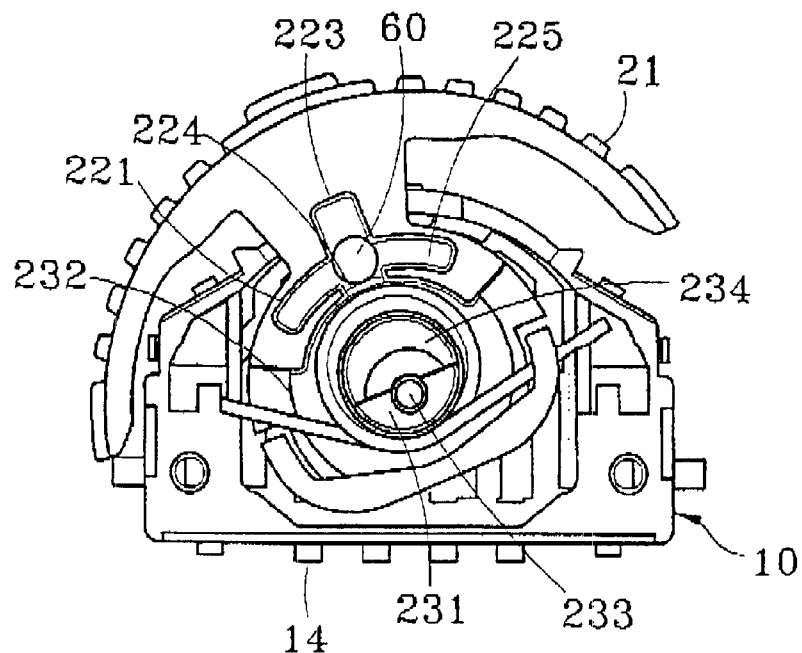
FIGS. 4A and 4B are the views of the embodiments showing the right and left switching motion of the button of the structure of the electronic switch of the present invention.
Figure 4B:
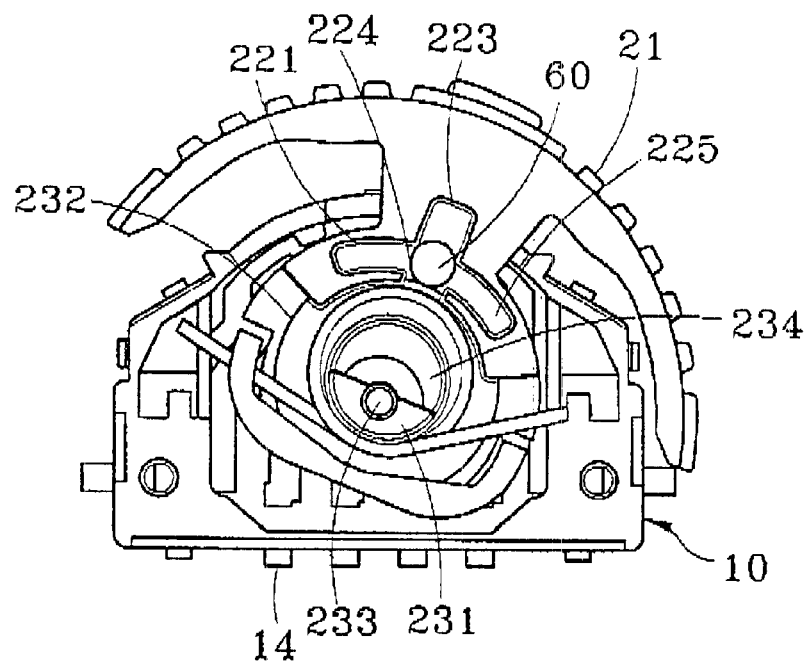

Referring to FIGS. 2, 4A and 4B, the actual operation of the electronic switch of the present invention with regard to the right and left movement of the button 20 is described as follows. When the button 20 is moved to the right and the left direction through an external force, the neck portion 22 together with the adjustment groove 221 and the pressing element 60 of the neck 22 of the button 20 will move within the space 15 of the case 10, and at each electrical signal generation locations of the electronic switch (when the button 20 is positioned at a specific left or right biasing angle, the signal will define the function for signal page roll, continuation roll or alike according to the electronic device), the pressing element 60 passes through the horizontal pressing points 531 and 532, and gets opposed against the elastic plate area 52. Therefore, as the pressing point 53 is pressed by the pressing element 60, the elastic plate area 52 will be pulled slightly outwardly to create an obvious hand contact stimulation. Besides the 5-segmented signal control of the present invention allows a synchronized movement by fixing the pressing element 60 along with the button 20, and therefore different signals can be generated by setting specific angle of the electronic switch according to the movement of the button 20 that correspond to the pressing point 53. This allows designing of an electronic switch with as many segmental signal control to suit the functional requirements of an electronic device.

Figure 5A:
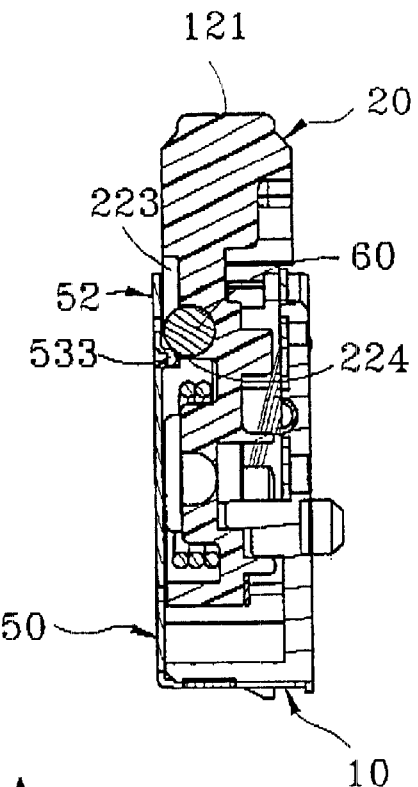
FIG. 5A is a sectional side view taken along the 5A—5A of the FIG. 1.
Figure 5B:
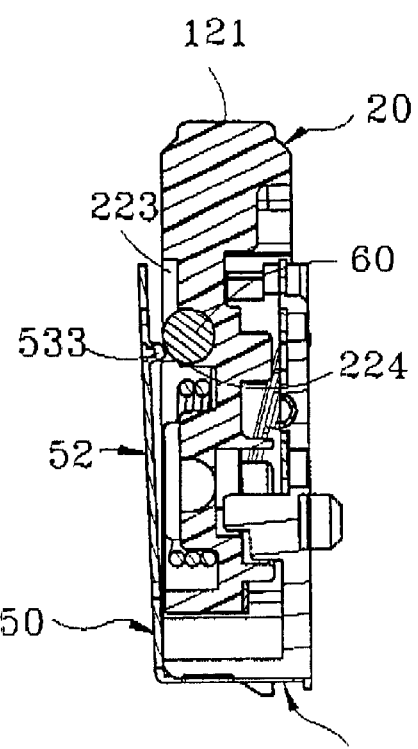
FIG. 5B is a sectional side view showing the up and down motion of the button of the structure of the electronic switch of the present invention.

Referring to FIGS. 5A and 5B, the actual operation of the electronic switch of the present invention with regard to the downward movement of the button 20 is described as follows. When the user uses the button cap 21 of the button 20 to move right and left to scroll through various functions of an electronic device, and in order to select a specific function, the user has to press down the button cap 21 of the button 20 by applying an external force on the button cap 21 to press the pressing element 60 in a downwardly direction, in doing do, the pressing element 60 passes the guiding slot 224 of the button set 20 and presses the vertical pressing point 533. In the meanwhile, the vertical pressing point 533 of the cover 50 correspondingly moves upwards through the guiding groove 223 and gets opposed against the elastic plate area 52. Therefore, when the pressing element 60 pushes the vertical pressing point 533, the elastic plate area 52 will be moved slightly outwardly to generate an obvious hand contact stimulation. Thus the scrolling through the various functions and selection of any specific function can be accomplished. Furthermore, once the external force is released, the button 20 and the pressing element 60 will return to their original position because of the elastic property of the elastic plate area 52.

According to one aspect of the present invention, the electronic switch of the present invention can generate an obvious hand contact stimulation regardless of moving right and left or up and down. Besides, as the pressing point 53 of the elastic plate area 52 and the pressing element 60 are made of metallic material therefore they will not be easily polished or get damaged, thus the life-time and the durability of the electronic switch can be effectively extended.

While the invention has been described in conjunction with a specific best mode, it is to be understood that many alternatives, modifications, and variations will be apparent to those skilled in the art in light of the a foregoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

What is claimed is:

1. A structure of an electronic switch assembly, comprising:
   a case, comprising a first and a second device areas, a button being disposed within said first device area, said button having a button cap with a neck portion, a rotating portion having a first resilient element and connecting to a side of said neck portion and an axial portion connecting axially with a second resilient element positioned or said rotating portion, and said neck portion of said button having an adjustment groove, a pressing element being provided in the adjustment groove; and a cover, assembled on said case covering said first and second device areas, and a elastic plate area being defined by a slit on said cover, a plurality of pressing points being formed as grooves at every signal generation location of the electronic switch, the pressing points being positioned on said elastic plate area corresponding to a position of said adjustment groove, wherein an external force can be applied to push the button in order to activate the pressing element to generate an electrical signal and to create a hand contact stimulation synchronized with movement of the button.

2. The structure of the electronic switch assembly according to claim 1, wherein the adjustment groove comprises a positioning hole in the neck portion for fixing the pressing element.

3. The structure of the electronic switch assembly according to claim 2, wherein a structure for implementing a downward movement of said button comprises a guiding groove and a guiding slot formed at a top side and a bottom side of said positioning hole and being spaced from the positioning hole.

4. The structure of the electronic switch assembly according to claim 1, wherein a structure for implementing a right and left movement of said button comprises two wing portions that extend from two sides of the adjustment groove.

5. The structure of the electronic switch assembly according to claim 1, wherein said pressing element is a metallic sphere.

6. The structure of the electronic switch assembly according to claim 1, wherein said pressing element and elastic plate area are made of a metallic material.

7. The structure of the electronic switch assembly according to claim 1, wherein said pressing points can be classified as a horizontal pressing point and a vertical pressing point.

8. The structure of the electronic switch assembly according to claim 7, wherein said horizontal pressing point is classified as first and second horizontal pressing points according to corresponding electrical signals generation location of said electronic switch.

* * * * *